Aug. 12, 1924.

H. W. JONES

SIFTER TOP CONTAINER

Filed Sept. 1, 1920

1,504,482

Inventor
Harry W. Jones

By: Munday, Clarke &
Carpenter Attys.

Patented Aug. 12, 1924.

1,504,482

UNITED STATES PATENT OFFICE.

HARRY W. JONES, OF NEW YORK, N. Y., ASSIGNOR TO AMERICAN CAN COMPANY, OF NEW YORK, N. Y., A CORPORATION OF NEW JERSEY.

SIFTER-TOP CONTAINER.

Application filed September 1, 1920. Serial No. 407,352.

*To all whom it may concern:*

Be it known that I, HARRY W. JONES, a citizen of the United States, residing in New York, in the county of New York and State of New York, have invented a new and useful Improvement in Sifter-Top Containers, of which the following is a specification.

My invention relates in general to containers for powder and the like, and more particularly to sifter tops therefor, having in combination a filling opening and a removable sifter cover.

A principal object of the invention is the provision of a container of this general type, having a top part permanently attached to the container body and requiring only one opening for filling the container and for ejecting the powder through perforations in the sifter cover.

Another object of the invention is the provision of a container for powder and the like, having a sifter top of this type, which comprises a single opening for inserting and ejecting the powder and a rotatable and removable cover therefor in which are perforations that may be easily opened or closed by merely rotating said cover.

A further object of the invention is the provision of a powder container of the type described, which may be easily filled after forming without removal of any of the permanently attached parts and which may be refilled indefinitely without damaging any of the parts in so doing, it thus being apparent that such a container is extremely economical and practical for use under varied conditions.

A still further object of the invention is the provision of a sifter powder container of compact form, having few and inexpensive parts, none of which need ever be removed for any purpose, excepting a sifter cover which itself is held positively and closely in place when attached, thus preventing escape of any powder except when the perforations therein are voluntarily opened.

Other objects and advantages of the invention will be apparent as it is better understood from the following description, which, taken in connection with the accompanying drawings, discloses a preferred embodiment thereof.

Referring to the drawings.

Figure 1:
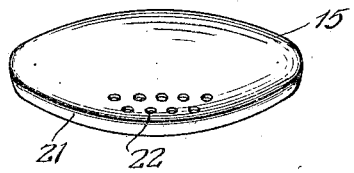
Figure 1 is a perspective of the top portion of a container showing the filling opening and means for attachment of the sifter cover, which is shown removed.
Figure 2:
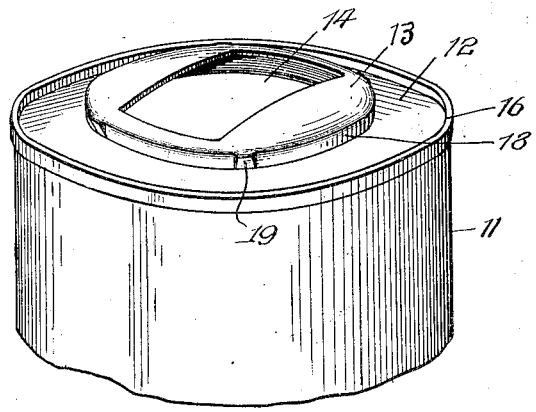
Fig. 2 is a top view of the container showing the relation of the opening and the perforations in the sifter cover when in closed position.
Figure 3:
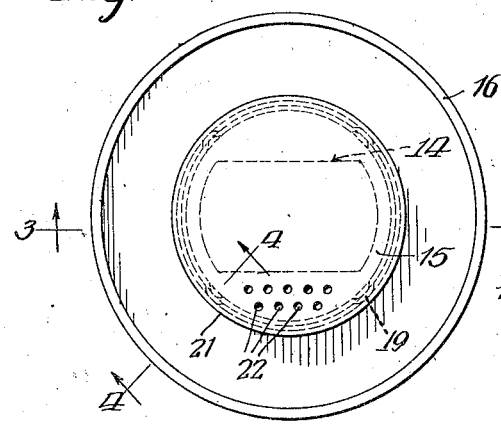
Fig. 3 is a sectional view of the top showing it attached to the container body, and the relative position of the opening and the sifter cover when the latter is in place, and is taken on the line 3—3 of Fig. 2.
Figure 4:
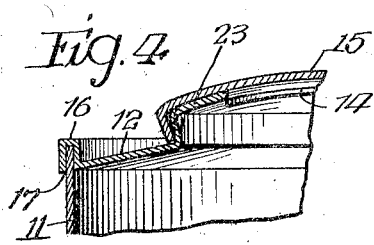
Fig. 4 is an enlarged section taken on the line 4—4 of Fig. 2, and showing in detail the parts of the top in attached position.

On the drawings it will be noted that the embodiment of the invention shown comprises primarily a body 11, a top designated generally by the reference character 12 having an elevated or partially domed portion 13, an opening 14, and a sifter cover 15. The top is seamed to the container body by the engagement of a U-shaped flange 16 with the upper edge 17 of the body or in any other preferred manner.

The elevated part 13 is partially domed but has upstanding walls 18 upon which are projections or dogs 19 which engage the depending flange 21 of the sifter cover, which may be snapped into place by downward pressure, freely rotated about the elevated part 13 and easily removed by hand.

In the elevated part 13 is a filling opening 14 which may be of any predetermined size or shape, it being here shown as oblong and curved at the ends. This shape is especially desirable since it is important that the opening should extend nearer to the edge of the dome in one direction than the other, so that rotation of the sifter cover will cause the perforations 22 therein to be positioned alternately over the opening and a solid part of the dome, thus permitting ready opening and closing thereof. Furthermore, the opening should be sufficiently large to permit easy filling of a container when the sifter cover is removed.

The depending flange 21 has its lower edges bent inwardly so that after they have been pressed over the projections 19, which are in the upper part of the upstanding wall 18, the cover will be held closely in place over the dome as shown at 23 and still will be easily rotatable. This prevents the escape of any powder except when the sifter cover is turned so that the perforations are brought immediately over the opening and thereby opened. The perforations comprising the sifter are grouped near the edge of the cover 15 in order to facilitate opening and closing by rotation in the manner hereinbefore described.

The commercial advantage of this simple construction and arrangement of parts, which combines means for filling a container without removing the entire top thereof, and a sifter, and requires but a single opening for all purposes, will be apparent to those familiar with the use of such articles.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A sifter top container, comprising a part permanently fixed to the body and having a filling opening, and a perforated part rotatable upon said fixed part to bring the perforations of the same into and out of sifting registration with said opening, said rotatable part being readily removable to permit filling.

2. A sifter top container for powder and the like, comprising a body of any preferred type, a top attached thereto, and having an elevated part in which there is a filling opening, and a rotatable cover removably attached to said elevated part, and having perforations therein so situated that they may be opened or closed as rotation may bring them over the opening or the solid portion of the top.

3. A container for powder and the like, having a sifter top, comprising an outer flange adapted to be seamed upon the container body, an elevated part having a filling opening of predetermined shape, and a removable and rotatable slip cover which is held in place by the engagement of a depending flange over projections spaced around the edge of the elevated part, and having perforations so situated that they may be opened or closed as rotation brings them over the opening or a solid portion of said elevated part.

4. A container and sifter for powder and the like, comprising a body, a top having a flange adapted to be seamed to the upper body flange, and having an elevated and partially domed part in which there is an opening of sufficient size for filling, said elevated part being engaged within a removable and rotatable cover having a depending flange and perforations arranged so that they may be opened and closed as rotation of the cover brings them over the opening or a solid portion of the domed part.

5. A sifter top container for powdered material, comprising a partially closed top portion, and a rotatable perforated snap cover embracing the same.

HARRY W. JONES.